G. F. CROSS.
APPARATUS FOR MOLDING CONCRETE WALLS.
APPLICATION FILED JULY 24, 1908.

952,236.

Patented Mar. 15, 1910.

3 SHEETS—SHEET 1.

G. F. CROSS.
APPARATUS FOR MOLDING CONCRETE WALLS.
APPLICATION FILED JULY 24, 1908.
952,236.
Patented Mar. 15, 1910.
3 SHEETS—SHEET 2.
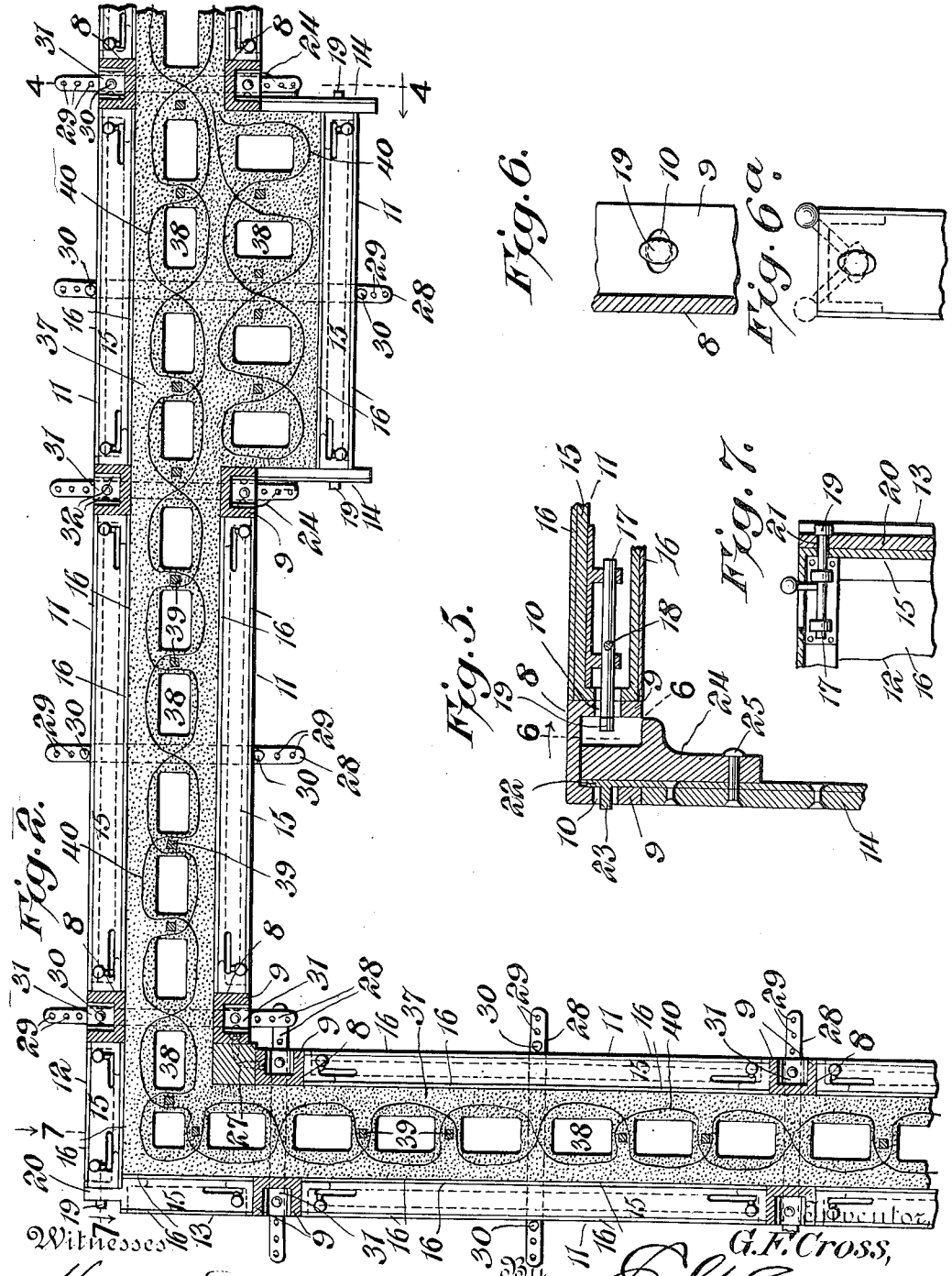

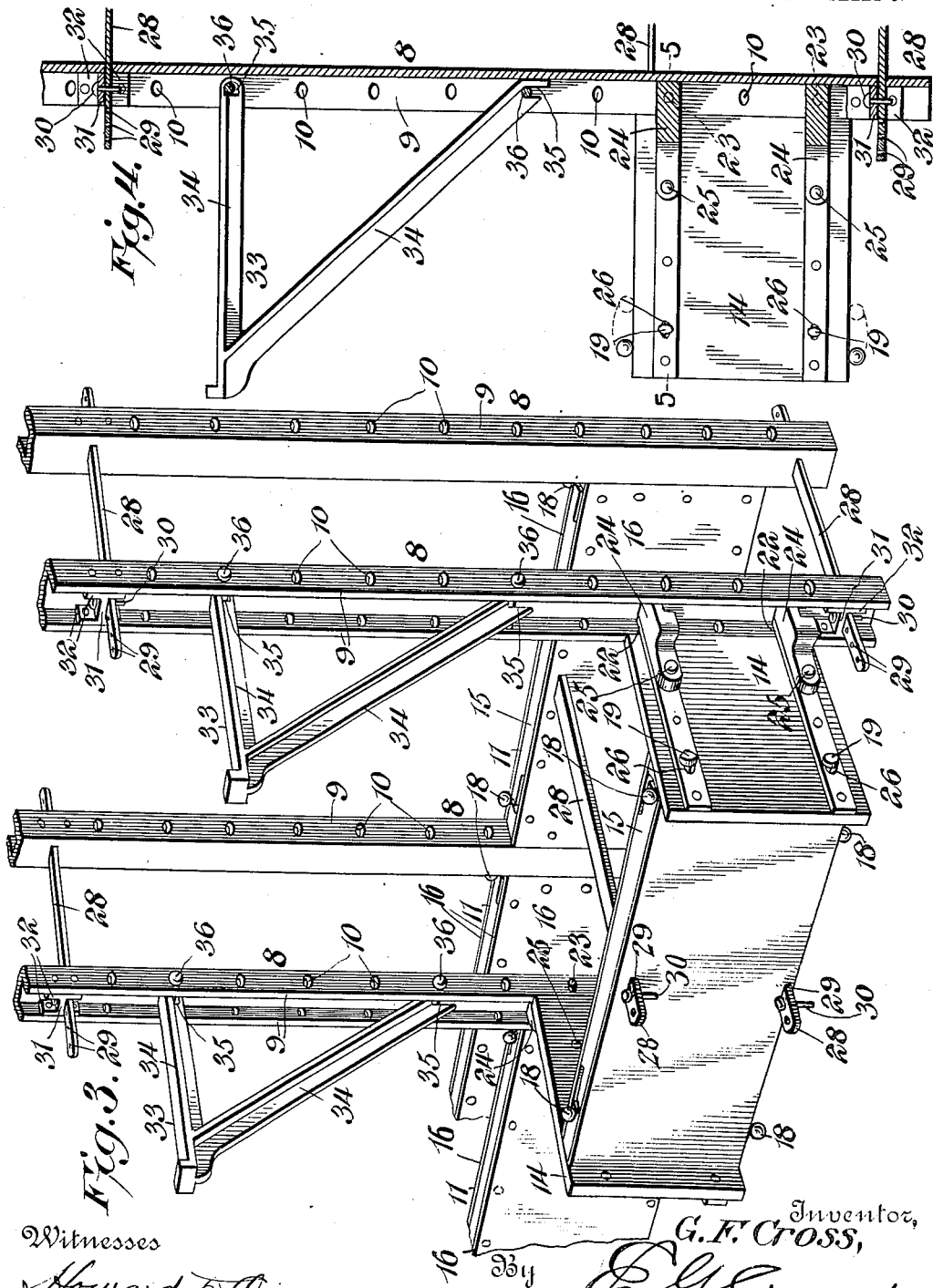

UNITED STATES PATENT OFFICE.

GEORGE F. CROSS, OF SAN ANTONIO, TEXAS.

APPARATUS FOR MOLDING CONCRETE WALLS.

952,236.   Specification of Letters Patent.   Patented Mar. 15, 1910.

Application filed July 24, 1908. Serial No. 445,195.

*To all whom it may concern:*

Be it known that I, GEORGE F. CROSS, a citizen of the United States, residing at San Antonio, in the county of Bexar and State of Texas, have invented a new and useful Apparatus for Molding Concrete Walls, of which the following is a specification.

The present invention relates to molding means employed in producing concrete or analogous walls, and the principal object is to provide a novel, simple and inexpensive structure, which when not in use can be compactly arranged so as to occupy but little space, which can be readily assembled and set up, can be arranged in various forms to correspond to the desired arrangement and character of the walls to be built, can be easily elevated as the walls progress, and is constructed of elements that can be put together by an ordinary workman without the use of tools.

The preferred embodiment of the invention is illustrated in the accompanying drawings, wherein:—

Figure 1 is a side elevation of a portion of the apparatus constructed in accordance with the present invention. Fig. 2 is a horizontal sectional view through the same. Fig. 3 is a perspective view of a portion of the apparatus. Fig. 4 is a sectional view on the line 4—4 of Fig. 2. Fig. 5 is a detail sectional view on the line 5—5 of Fig. 4. Fig. 6 is a detail sectional view on the line 6—6 of Fig. 5. Fig. 6ª is a detail end view of a portion of one of the mold sections showing the bolt and indicating the different positions it assumes. Fig. 7 is a detail sectional view on the line 7—7 of Fig. 2. Fig. 8 is a plan view of a device for forming an air duct or flue. Fig. 9 is a vertical sectional view through the same.

Similar reference numerals designate corresponding parts in all the figures of the drawings.

A portion only of the apparatus is shown, but it is believed to be entirely sufficient to disclose the structure of the same, the remaining parts being practically duplicates of what is illustrated.

In the form of construction shown, spaced standards 8 are employed that are constructed of channel iron and have their flanges 9 arranged in outstanding relation. These flanges are provided with vertical sets of elongated preferably elliptical openings 10. Inner and outer sets of said standards are employed and form parts of the inner and outer mold walls. The remainder of said mold walls are formed of mold sections 11, 12, 13 and 14. The sections 11, 12 and 13 comprise frames 15 of channel iron, to both sides of which are riveted or otherwise secured facing plates 16 having their exposed surfaces smooth. Mounted within said sections are sliding bolts 17 that are also capable of rotary movement, the said bolts being permanently secured to the sections and having suitable operating knobs or handles 18 that project from the edges of said sections. These bolts are provided on their outer ends with elongated transversely disposed heads 19 that are elliptical in form, being of a size to pass through the openings 10 when registered therewith, but after having been passed through the openings and turned as shown in Fig. 6, they cannot be withdrawn. The mold sections, together with their bolts, form connecting means between adjacent standards of each wall, so that the latter will be maintained in upright position without the use of extra cross pieces. It is to be noted that the bolts are housed within the hollow mold sections so that they will not become covered with concrete which would, when hardened, prevent the effective operation of the bolts.

The sections 12 and 13 form corners, as shown and while the section 12 is provided at both ends with bolts, the section 13 has bolts at one end only. The outer end has a flange 20 provided with elongated openings 21 to receive the bolts carried by the adjacent end of the section 12. The sections 14 are employed for producing pilasters, breasts or thickened portions of the walls and comprise plates, each having on one end ears 22 that carry outstanding pins 23 arranged to engage in the openings 10. Retaining blocks 24, pivoted, as shown at 25 on the plates 14, are arranged to engage in the channels of the standards engaged by the ears 22 and pins 23 to prevent the disengagement of said pins from the openings. It is believed that this will be clear by reference to Figs. 3, 4 and 5. The outer ends of the plates or sections 14 have elongated openings 26 to receive the bolts of the section 11 placed between the sections 14.

The corner of the outer mold wall, as already explained, is formed by the sections 12 and 13. The inner corner is produced by a pair of the standards 8, which are preferably fastened to a corner block 27. In order to hold the inner and outer mold walls against spreading, tie straps 28 are employed, certain of these tie straps being located at the standards 8, others being preferably arranged between the standards and consequently engaging the mold sections between said standards. These straps are preferably of flat iron and have in their terminal portions a series of openings 29 arranged to be detachably engaged by pins 30 that also detachably engage the mold sections and standards. In the present construction, the said pins 30 pass through the flanges of the mold section frames, while in the channels of the standards are secured webs 31 through which said pins are passed, these webs being provided with ears 32 riveted to the flanges of the standards.

In connection with the mold sections, there are preferably employed scaffold brackets 33 composed of angularly disposed arms 34, the inner ends of which fit between the flanges of the standards and have sockets 35. Pins 36, which pass through the openings 10, also pass through the sockets, and thus hold the brackets in place.

The wall structure may be of any desired type well known to the art, but as shown more particularly in Fig. 2, the body 37, which is of concrete or analogous material, has vertical ducts, flues or passageways 38 therein, and between these passageways are arranged vertical solid rods 39 that may or may not be roughened as desired. A tie wire 40 is preferably embedded at suitable intervals in the wall, and is woven back and forth about the rods and on opposite sides of the ducts or passageways 38. The ducts, flues or passageways 38 are formed by any suitable mechanism. For instance in Figs. 8 and 9, a tubular core member 41 is employed that can be contracted and expanded, the sections thereof being connected by swinging links 42 which are in turn pivoted to a vertical operating rod 43 having a handle 44 at its upper end. It will of course be understood that these core members can be made to conform to the desired cross sectional configuration of the flues or ducts.

It will be evident that this structure when not in use, can be taken down and stored in a very small space. Moreover it can be readily set up by an ordinary workman and no tools are required for the purpose. When set up, a strong, rigid mold is produced that will not spring or give under pressure. Moreover walls of different thicknesses can be made and cross walls, thickened portions and the like can be formed wherever desired. Another decided advantage resides in the fact that after the mold has once been set up, it can be raised as often as filled, the standards 8 being made of different lengths according to the height of the rooms or walls to be formed. The raising of the mold sections can be easily accomplished by one man, for all that is necessary with the majority of the sections is to remove the pins 30, and the ties 28, which engage said sections, disengage the lower bolts 17 from the standards or the sections with which they are engaged and swing the mold sections outwardly and upwardly. This reverses them, and at the same time elevates them. The lower bolts 17 then become the upper bolts, which are again engaged in the openings.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In apparatus for building concrete walls, the combination with a standard, of a mold section adapted to project at right angles from the standard and having a laterally projecting pin that detachably interlocks with said standard, and a retaining device pivotally mounted on the mold section and detachably engaging between the webs or flanges of the standard to maintain the pin in its interlocked engagement.

2. In apparatus for building concrete walls, the combination with a standard of channel iron, of a mold section having a member arranged for detachable interlocking engagement with the standard, and a retaining device mounted on the section independently of the member and detachably engaging in the channel to maintain the interlocking engagement.

3. In apparatus for building concrete walls, the combination with a standard of channel iron having an opening, of a mold section having a pin that detachably engages in the opening by a lateral movement of the section, and a retaining device pivotally mounted on the mold section independently of the pin and detachably engaging in the channel of the standard to prevent lateral movement of said section and maintain the pin in engagement with the standard.

4. In an apparatus for building walls, the combination of a standard of channel iron having its flanges provided with openings, a wall section having its end disposed against the flat side of one of the flanges, a plurality of bolts projectable from the said end of the mold section for engaging in the openings of the standard, a mold section disposed at an angle to the first and having one end bearing against the edge of the other flange of the standard, members on the second mold section projecting from the end thereof and extending into the space between the flanges of the channel iron and engaging in openings thereof, and devices on the second section for engaging the standard to hold the said members engaged in the openings of the standard.

5. In apparatus for building concrete walls, the combination with spaced standards of angle iron having elongated openings in their flanges, of mold sections comprising frames of angle iron and facing sheets secured thereto, said sections fitting between the standards, bolts mounted on the sections between the said sheets and being slidable and rotatable thereon and having elongated heads that pass through the openings in the flanges of the standards, other angularly disposed sections, means for securing certain of said sections to the standards, and means for detachably securing the angularly disposed sections together, said means including elongated openings formed in certain of the same, and bolts rotatable on the other sections and having elongated heads that pass through the openings.

6. In apparatus for building concrete walls, the combination with a support, of a reversible mold section mounted on the support, and detachable upper and lower connections between the section and support, the upper connection constituting a pivot on which the section turns to an elevated position when the lower connection is detached.

7. In apparatus for building concrete walls, the combination with a support, of a reversible mold section mounted on the support, and upper and lower bolts mounted on the section and detachably engaging the support, the upper bolt constituting a pivot on which the section turns to an elevated position when the lower bolt is detached from the support.

8. In apparatus for building concrete walls, the combination with spaced supporting standards having openings, of a reversible hollow mold section having opposite smooth faces, and upper and lower sets of bolts mounted within the section and movable to projecting relation from the ends thereof, said bolts detachably engaging in the openings of the standards and having actuating devices, the upper bolts constituting pivots on which the section turns when the lower bolts are disengaged from the standards.

In testimony that I claim the foregoing as my own, I have hereto affixed my signature in the presence of two witnesses.

GEORGE F. CROSS.

Witnesses:
M. E. PORTIS,
H. B. SOLLWAY.